(12) United States Patent
Rene et al.

(10) Patent No.: US 8,275,559 B2
(45) Date of Patent: Sep. 25, 2012

(54) FAULT DETECTOR FOR A TIP AND RING CIRCUIT, A METHOD OF PROTECTING SUCH A CIRCUIT AND A POWER SUPPLY INCLUDING THE FAULT DETECTOR

(75) Inventors: Raymond Rene, Plano, TX (US); Stephen C. Guthrie, Allen, TX (US); Jacob Scaria, Mesquite, TX (US)

(73) Assignee: Linage Power Corporation, Mesquite, TX (US)

( * ) Notice: Subject to any disclaimer, the term of this patent is extended or adjusted under 35 U.S.C. 154(b) by 936 days.

(21) Appl. No.: 12/058,437

(22) Filed: Mar. 28, 2008

(65) Prior Publication Data

US 2008/0243402 A1    Oct. 2, 2008

Related U.S. Application Data

(60) Provisional application No. 60/908,888, filed on Mar. 29, 2007.

(51) Int. Cl.
*G01R 31/00* (2006.01)
*G01R 31/14* (2006.01)

(52) U.S. Cl. .......................................... 702/58; 324/509

(58) Field of Classification Search ............... 702/58, 702/57, 59–60, 64–65, 81, 84, 107–108, 702/117, 127, 182–185, 189; 324/500, 509, 324/512, 522, 525, 528, 530, 537, 539, 600, 324/691, 771, 555; 323/220, 229, 233; 361/42, 361/54, 63, 78–79, 93.1, 93.7; 379/1.01, 379/21, 22.03, 27.05, 29.03–29.04, 322–326
See application file for complete search history.

(56) References Cited

U.S. PATENT DOCUMENTS

| | | | | |
|---|---|---|---|---|
| 4,542,432 A * | 9/1985 | Nichols et al. | | 361/44 |
| 4,685,129 A * | 8/1987 | Gavrilovich | | 379/324 |
| 5,228,072 A * | 7/1993 | Ingalsbe et al. | | 379/21 |
| 5,862,200 A * | 1/1999 | Sheets | | 379/22.03 |
| 7,193,827 B2 * | 3/2007 | Reid et al. | | 361/42 |
| 7,242,557 B2 * | 7/2007 | Ward | | 361/42 |
| 2004/0037018 A1 * | 2/2004 | Kim | | 361/42 |
| 2005/0163308 A1 * | 7/2005 | Smith et al. | | 379/395.01 |
| 2007/0030607 A1 * | 2/2007 | Liscinsky | | 361/42 |
| 2008/0106833 A1 * | 5/2008 | Lewinski et al. | | 361/49 |

* cited by examiner

*Primary Examiner* — Toan M Le (57) ABSTRACT

A fault detector for use with a telephone wire-pair having a return conductor and an output conductor, a method of protecting a telecommunications network including the telephone wire-pair and a power supply for the telecommunications network. In one embodiment, the fault detector includes (1) a passive sensor coupled between Earth and the wire-pair to detect a ground fault thereon, (2) an amplifier having inputs coupled across the passive sensor and configured to characterize the ground fault in terms of a value and (3) a controller configured to receive the value via an output of the amplifier and compare the value to a threshold to determine if the ground fault exceeds a safety limit.

20 Claims, 5 Drawing Sheets

FAULT DETECTOR FOR A TIP AND RING CIRCUIT, A METHOD OF PROTECTING SUCH A CIRCUIT AND A POWER SUPPLY INCLUDING THE FAULT DETECTOR

CROSS-REFERENCE TO RELATED APPLICATION

This application claims the benefit of U.S. Provisional Application Ser. No. 60/908,888 filed on Mar. 29, 2007, entitled "TIP AND RING GROUP FAULT PROTECTION FOR FTTN/FTTC/FTTP APPLICATIONS," by Raymond Rene, et al., which is incorporated herein by reference in its entirety.

TECHNICAL FIELD OF THE INVENTION

The present invention is directed, in general to fault detection and, more specifically, to detecting when one of the conductors of a tip and ring circuit are connected or shorted to Earth.

BACKGROUND OF THE INVENTION

Optical fiber has been used in telecommunication networks as "backbones" to link central offices (COs) to one another. Traditionally, ordinary twisted pairs of copper wire ("wire-pairs") have been used as "local loops" to link the COs to a customer's premises (CP). Wire-pairs, however, are not conducive to providing high data rate services to customers over the entire distance between a CO and the CP. Accordingly, telecommunication companies are transitioning to using optical fiber between the COs and the customer premises.

Fiber-to-the-Curb/Node/Premises (FTTC/FTTN/FTTP or, generally, FTTX) is a distribution method for delivering a combination of broadband services to customers. FTTX offers a network architecture that uses optical fiber to replace all or part of the wire-pairs between the CO and the CP to deliver a combination of broadband services including voice, Internet, broadcast television and video-on-demand. An interconnection point is used at some point between the CO and the CP to connect the optical fiber to the wire-pairs. The interconnection point may be, for example, a connection box or a node.

At an interconnection point, conversion equipment is needed to convert the optical signals on the optical fiber to electrical signals for delivery to the CP over the wire-pair. This requires the location of power consuming equipment at the interconnection point and necessarily outside of the battery-backed CO environment.

Unfortunately, optical fibers are unsuited to convey the electric power from the CO to the conversion equipment. The conversion equipment, therefore, must derive its electric power in a different way. The conversion equipment could use the commercial power grid at the interconnection point. This, however, requires a connection to the power grid and is unsatisfactory when the power grid fails. The conversion equipment loses its source of power, and telecommunication services are interrupted until power is restored. Given the historical reliability of the nation's telecommunication system, this is unacceptable.

One way to deliver power to remote sites without interruptions is to use uninterruptible power delivered from the CO at elevated voltages over wire-pairs. Thus, the wire-pairs that the optical fibers superseded can be used as conduits for electric power rather than for telephone conversations. The wire-pairs can provide power all the time or only during grid failures. Historically, a power converter is used to convert the operating voltage at the CO to a higher voltage for transmission across the wire-pairs. The transmission voltage is then converted to a suitable operating voltage for the equipment at the interconnection point. Typically, the CO operating voltage is 48 V DC and power is delivered to the equipment via the wire-pairs via a −190 output and a return. Multiple wire-pairs in parallel may be used.

Although the latter approach avoids connecting to the commercial power grid, using wire-pairs for electric power has its own complications. The relatively high transmission voltage of 190 V DC is necessary given the electrical resistance of the wire-pairs. However, to maintain safety, all wire-pairs used for local loops fall under Class 2 of the National Electrical Code (NEC), which establishes a 100 volt-ampere (VA) limit on the wire-pairs. Therefore, line-dedicated 190V current limiters must also be used at the CO to ensure that the 100 VA limit per twisted pair is not exceeded. Additionally, when the transmission voltage exceeds 140 V DC, the ground fault current can not exceed 10 mA even in the case where one of the wires of the wire-pair (the output or return) is connected or shorted to Earth. This limit is a safety requirement mandated by, for example, Underwriters Laboratories standard UL-60950-21, Canadian Standards Association CSA-22.2 and Network Equipment-Building System (NEBS) GR1089-CORE. Accordingly, what is needed in the art is a system and method to provide dependable power to conversion equipment located distal from the CO while complying with the mandated safety requirements.

SUMMARY OF THE INVENTION

To address the above-discussed deficiencies of the prior art, one aspect of the disclosure provides a fault detector for use with a telephone wire-pair having a return conductor and an output conductor. In one embodiment, the fault detector includes (1) a passive sensor coupled between Earth and the wire-pair to detect a ground fault thereon, (2) an amplifier having inputs coupled across the passive sensor and configured to characterize the ground fault in terms of a value and (3) a controller configured to receive the value via an output of the amplifier and compare the value to a threshold to determine if the ground fault exceeds a safety limit.

In another aspect, the disclosure provides a method of protecting a telecommunications network including a telephone wire-pair having a return conductor and an output conductor. In one embodiment, the method includes: (1) detecting a ground fault on the wire-pair, (2) characterizing the ground fault in terms of a value, (3) determining, based on the value, if the ground fault is a fault of the return conductor or a fault of the output conductor, (4) selecting a threshold based on the determining and (5) comparing the value to the selected threshold to determine if the ground fault violates a safety limit.

In yet another aspect, the disclosure provides a power supply for a telecommunications network. In one embodiment, the power supply includes: (1) a power converter configured to provide power to a telephone wire-pair having a return conductor and an output conductor and (2) a fault detector having: (2A) a passive sensor coupled between Earth and the wire-pair to detect a ground fault thereof, (2B) an amplifier having inputs coupled across the passive sensor and configured to characterize the ground fault in terms of a value and (2C) a controller configured to receive the value via an output of the amplifier and compare the value to a threshold to determine if the ground fault exceeds a safety limit. The controller is further configured to direct the power converter to reduce power provided to the wire-pair based on the compare.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
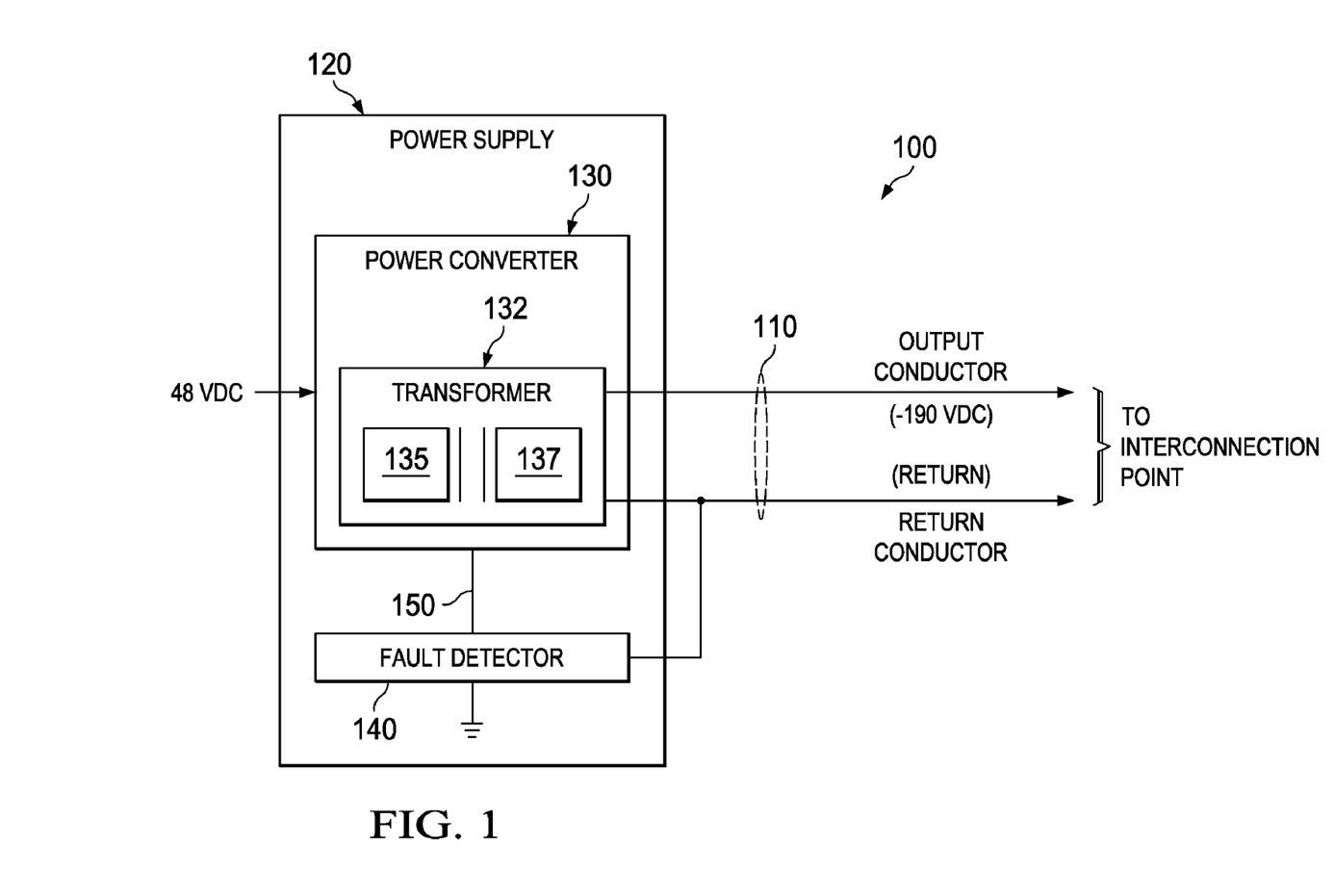
FIG. 1 illustrates a block diagram of an embodiment of a system, including a power supply constructed according to the principles of the present invention, for providing electric power via a telephone wire-pair to telecommunications equipment.

Referring initially to FIG. 1, illustrated is a diagram of an embodiment of a system 100 for providing electric power via a telephone wire-pair 110 to telecommunications equipment. In addition to the telephone wire pair 110, the system 100 includes a power supply 120. The power supply 120 may be located in the CO of a telecommunications company. The system 100 may be employed with a FTTX architecture to provide power to the conversion equipment for the optical fiber to wire-pair transition.

The wire-pair 110 is a copper wire-pair typically used between a CO and the CP. The wire-pair 110 has an output conductor (i.e., a ring conductor which is negative) and a return conductor (i.e., a tip conductor which is positive). The output conductor may operate at −190 V DC from ground (reference) and the return conductor may operate at ground (i.e., provides the reference). As such, the wire-pair may be constructed of 24 gage copper wire sufficient to support 200 V DC from ground. As illustrated, the wire-pair 110 connects the power supply 120 to an interconnection point.

Figure 2:
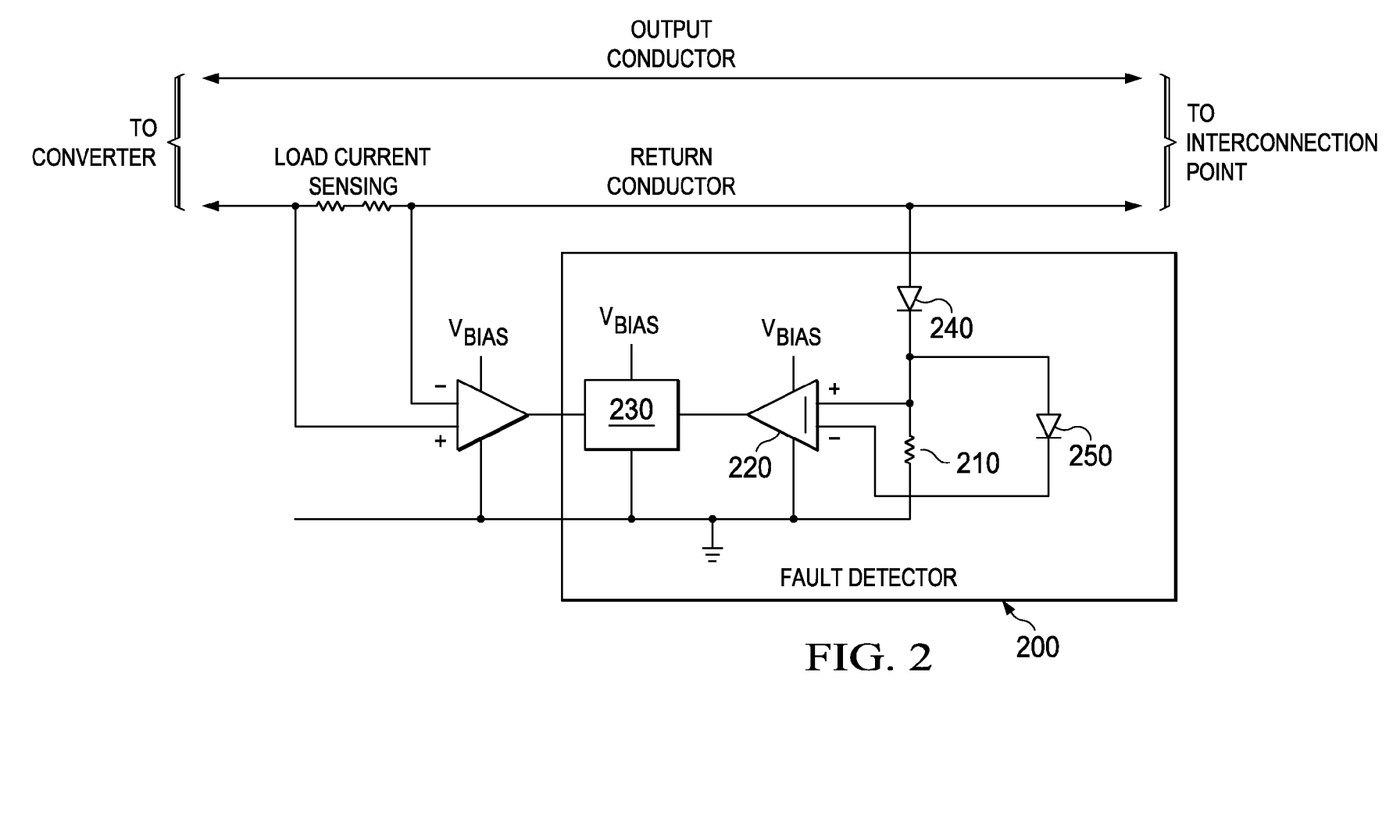
FIG. 2 illustrates a circuit diagram of an embodiment of a fault detector constructed according to the principles of the present invention.

The power supply 120 includes a power converter 130 and a fault detector 140. The power supply 120 may include additional components typically included in a power supply that are not illustrated or discussed herein. For example, the power converter 130 may also include a load current sensing device that determines the load current of the wire-pair. A load-current sensing device is illustrated in FIG. 2. The power converter 130 may be a conventional converter used to provide power over a wire-pair in a telecommunications network. The power converter 130 includes a transformer 132 having a primary winding 135 and a secondary winding 137. Additionally, the transformer 132 may include an auxiliary winding that provides a bias voltage for the components of the fault detector 140.

The primary winding 135 is physically coupled to a power source and the secondary winding 137 is physically coupled to the wire-pair 110. The wire-pair 110 provides the transmission voltage via the output and the return conductors to an interconnection point. The transmission voltage may be 190 V with a −190 V DC on the output conductor and the return conductor providing the return (ground). The interconnection point, such as a connection box, employs the power delivered by the wire-pair 110 for the equipment therein. The primary winding 135 is connected to the existing power supply of the CO. In most COs, the power supply is a 48V DC power supply. Thus, the power converter 130 may convert the 48 V DC supply voltage to +/−190 V DC to provide the 190 V DC to the interconnection point via the wire-pair 110.

The fault detector 140 is coupled between Earth and the wire-pair 110 to detect a ground fault on both the output and the return conductors. The fault detector 140 utilizes a passive sensor, such as a traditional shunt resistor, and an associated amplifier to detect ground fault conditions on both the output conductor and the return conductor. The amplifier characterizes a ground fault sensed by the passive sensor in terms of a value. The value may be a voltage value. The value is provided to a controller of the fault detector 140 via an output of the amplifier. The controller compares the value to a threshold to determine if the ground fault exceeds a safety limit. The safety limit may be 10 mA in accordance with the standards previously mentioned. Of course, a different safety limit value may be used based on different standards and/or transmission voltages. The fault detector 140 may be configured as the fault detector in FIG. 2.

For an output conductor condition, the controller compares the characterized value against a pre-established threshold. If the pre-established threshold is exceeded, the controller issues a command to reduce the power provided by the power converter 130. The command is transmitted to the power converter 130 via a signal path 150 of the power supply 120. The command may be a signal to instruct the power converter 130 to reduce the transmission voltage. In some embodiments, the signal may instruct the power converter 130 to reduce the transmission voltage completely (i.e., 0 V). In other embodiments, the signal may instruct the power converter 130 to reduce to transmission voltage by a certain percentage. For example, the power converter 110 may be instructed to reduce the transmission voltage to 90%. By reducing the transmission voltage to a percentage greater than zero allows the fault detector 140 to verify that a ground fault greater than the safety limit has occurred. Thus, the fault detector 120 may be able to filter-out erroneous detections of ground faults over the safety limit. The percentage of reduction may be pre-determined and based on the number of detections of a particular ground fault within a designated time. Regarding a return conductor condition, a similar procedure is executed, except the controller compares the characterized value to a pre-acquired and stored positive current value to detect a percentage reduction of the same as can be caused by a ground fault on the return conductor.

Turning now to FIG. 2, illustrated is a circuit diagram of an embodiment of a fault detector 200 constructed according to the principles of the present invention. The fault detector 200 is configured to detect faults associated with a telephone wire-pair. Typically, the fault detector 200 is located in a CO. The fault detector 200, however, may be located in other locations where downstream protection of equipment is needed. The fault detector 200 is connected between the return conductor of the wire-pair and Earth. The fault detector 200 includes a passive sensor 210, an amplifier 220, a controller 230, a rectifying diode 240 and a shorting diode 250. The rectifying diode 240 and the shorting diode 250 are conventional components that provide protection for the controller 230 and the wire-pair. The rectifying diode 240 performs a rectifying function to control current direction and the shorting diode 250 performs a limiting function to control the input voltage to the amplifier 220. The rectifying diode 240 may have high efficiency rectifying qualities and the shorting diode 250 may be a Schottky diode.

The passive sensor 210 is positioned between Earth and the return conductor of the wire-pair to detect a ground fault on the wire-pair. In one embodiment, the passive sensor 210 may be a shunt resistor. During normal operation conditions (i.e., there is no ground fault on the wire-pair), current does not flow across the passive sensor 210. In the case where a ground fault exists on the output conductor, the passive sensor 210 detects current flowing therethrough. There is no current flow through the passive sensor 210 for either a fault or non-fault condition of the return conductor. When a ground fault is present on the return conductor, a short to Earth is detected on this connection which causes the output of the amplifier 220 to fall below a calibrated zero current output level. The controller 230 recognizes the dip below the calibrated zero current output level of the amplifier 220 and generates a fault alarm condition in response. Due to the inherent offset of the fault detector 200, the output of the amplifier 220 is always a positive value when there is a zero current through the passive sensor 210.

The amplifier 220 has inputs coupled across the passive sensor 210 and is configured to characterize a ground fault in terms of a value. In one embodiment the amplifier is an op-amp. The amplifier 220 may be a general purpose dual op-amp device.

The controller 230 may be a conventional programmable device configured to store and manipulate data. The controller 230 may be a conventional microcontroller. In addition to the functions of the fault detector 200 disclosed herein, the controller 230 may also be used for other functions associated with the wire-pair or a power supply. For example, the controller 230 may also monitor the current flow through the return conductor during normal operating conditions using the load current sensing device as illustrated. In FIG. 2, the load current is sensed and then characterized by an op-amp for input to the controller 230. In addition to normal operation, the knowledge of the current flow can also be used by the controller 230 to determine if a ground fault condition exists on the return conductor.

The controller 230 is configured to receive the characterized value via an output of the amplifier 220 and compare the value to a threshold to determine if the ground fault exceeds a safety limit. The controller 230 is also configured to reduce power provided to the wire-pair from the power converter based on the compare. The controller 230 stores at least two different thresholds for comparison to the characterized value. A first threshold is a pre-established threshold representing a fault connection between the output conductor and Earth. The second threshold is a positive value representing zero current through the passive sensor 210 that is used for detecting a ground fault associated with the return conductor. Both of the thresholds are pre-determined and stored in the controller 230.

Based on the characterized value, the controller 230 can determine what type of fault has been detected by the passive sensor 210. For example, during normal operating conditions, only a nominal amount of current, if any, flows across the passive sensor 210 and the output of the amplifier 220 is a positive value. This positive value may be acquired and stored in the controller 230 during installation, calibration or testing of the fault detector 200. During a fault condition with the return conductor, the passive sensor 210 is shorted with both sides shorted to Earth. Since the passive sensor 210 is shorted, again no current is flowing across it. An ohmic connection between the return conductor and the Earth, however, is sensed by the passive sensor 210 and characterized by the amplifier 220. The characterized value is then provided as an output of the amplifier 220 to the controller 230. In a return fault condition, the characterized value is less than the stored positive value. Since the characterized value is less than the stored positive value, the controller 230 is configured to recognize that the fault is a return conductor ground fault. For example, the controller 230 can use this condition and the knowledge of current flowing through the wire-pair via the load current sensing device to determine that the fault is a return conductor fault. The controller 230 can then determine if the current through the ground fault exceeds the safety limit based on a calibrated value.

For an output conductor fault, current does flow through the passive sensor 210. This current is detected by the passive sensor 210 and characterized by the amplifier 220 in terms of a value. In this case, the value will be greater than the stored positive value. Accordingly, the controller 230 recognizes the fault is with the output conductor and compares the characterized value to a pre-determined threshold that represents the safety limit to determine if the ground fault current exceeds the safety limit.

Figure 3:
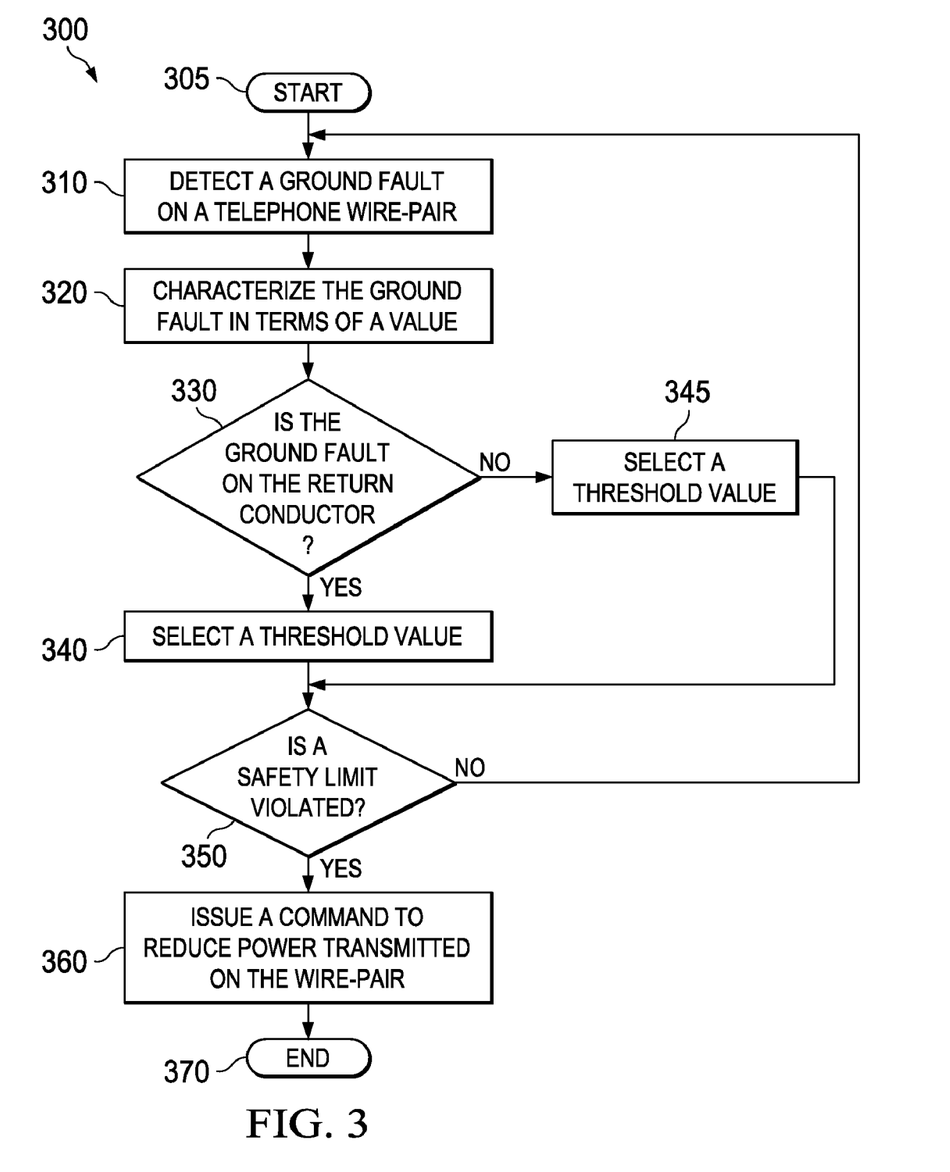
FIG. 3 illustrates a flow diagram of an embodiment of a method of protecting a telecommunications network carried out according to the principles of the present invention.

FIG. 3 illustrates a flow diagram of an embodiment of a method of a protecting a telecommunications network carried out according to the principles of the present invention. The method may be carried out by a fault detector as described in FIG. 1 or 2. The method begins with an intent to detect a ground on a conductor of a telephone wire-pair in a step 305.

After starting, a ground fault is detected on a telephone wire-pair in a step 310. The ground fault may be detected by a passive sensor such as a shunt resistor. In some instances, the ground fault may be detected by recognizing current flowing through the passive sensor. In other instances, the ground fault may be detected by recognizing an ohmic difference via the passive sensor.

After detecting a fault, the ground fault is characterized in terms of a value in a step 320. An op amp may be used to convert the current across the passive sensor to the value. The value may be a positive voltage. Additionally, the ground fault may be characterized as a difference between a calibrated zero current output level and an output level of an amplifier coupled to the passive sensor.

After the value is characterized, a determination is made based on the characterized value if the ground fault is a fault of the return conductor or a fault of the output conductor in a first decisional step 330. If the ground fault is a fault of the return conductor, then a threshold representing a zero current output level is selected as a threshold in a step 340. The threshold may be a positive value determined during calibration of the fault detector that represents zero current through the passive sensor during normal operating conditions. The pre-established threshold may be a pre-acquired and stored positive value that represents a current level used to detect a percentage reduction thereof as can be caused by a return conductor.

The characterized value is then compared to the selected threshold and a determination is made if the ground fault violates a safety limit (e.g., exceeds a safety limit) in a second decisional step 350. If the characterized value does violate the safety limit, a command is issued to reduce power transmitted on the wire-pair in a step 360. In some embodiments, the power may be completely turned-off. In other embodiments, the power may be reduced and a further check made to insure that a ground fault has occurred. The method 300 then ends in a step 370. Returning now to step 350, if the ground fault current does not violate the safety limit, the method 300 continues to step 310 and continues to monitor for fault conditions.

Returning now to the first decisional step 330, if the ground fault is a fault of the output conductor, then another threshold value is selected as the threshold in a step 335. The other threshold value may be a pre-established threshold that is pre-acquired and stored to represent current flowing through the passive sensor that equals the safety limit. The method 300 then continues to step 350.

In the above-described method, steps 330-360 may be performed by a controller or other various conventional digital data processors or computers, wherein the computers are programmed or store executable programs of sequences of software instructions to perform one or more of the steps of the method. The software instructions of such programs may be encoded in machine-executable form on the controller. In one embodiment, the controller is a microcontroller.

Figure 4:
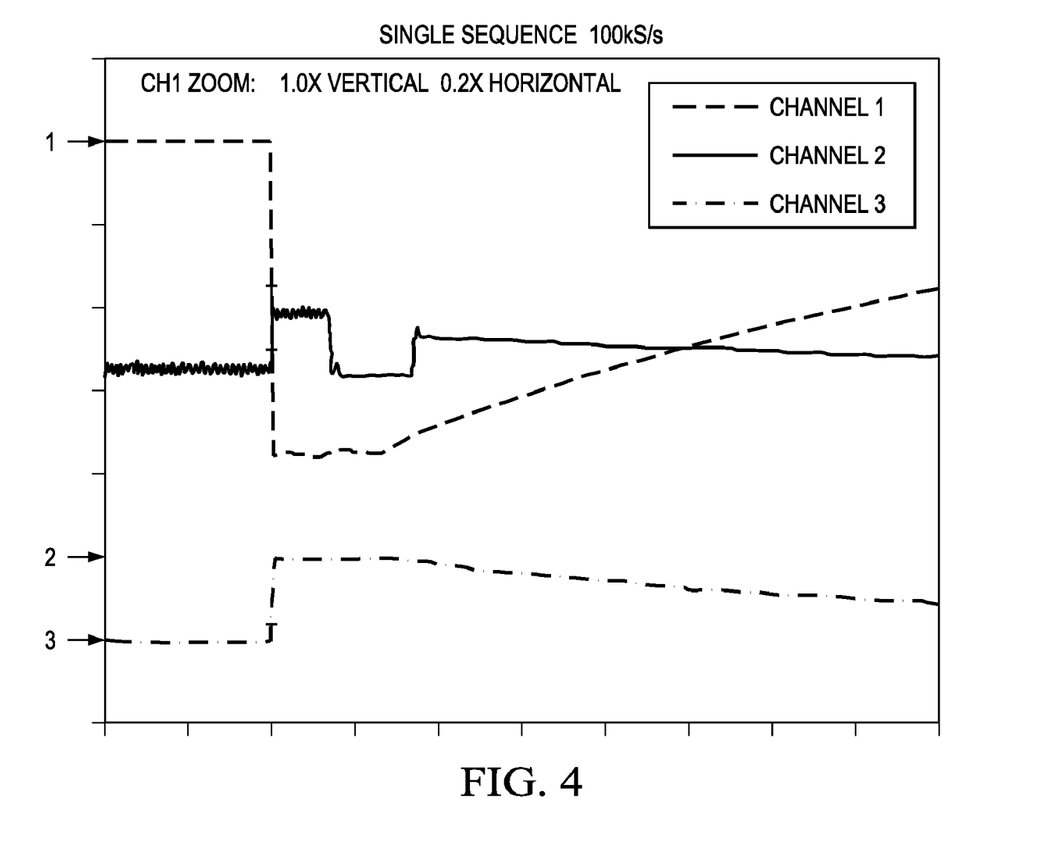
FIG. 4 illustrates a graph of waveforms generated by a ground fault test for an output conductor to Earth connection employing an embodiment of a fault detector constructed according to the principles of the present invention.
Figure 5:
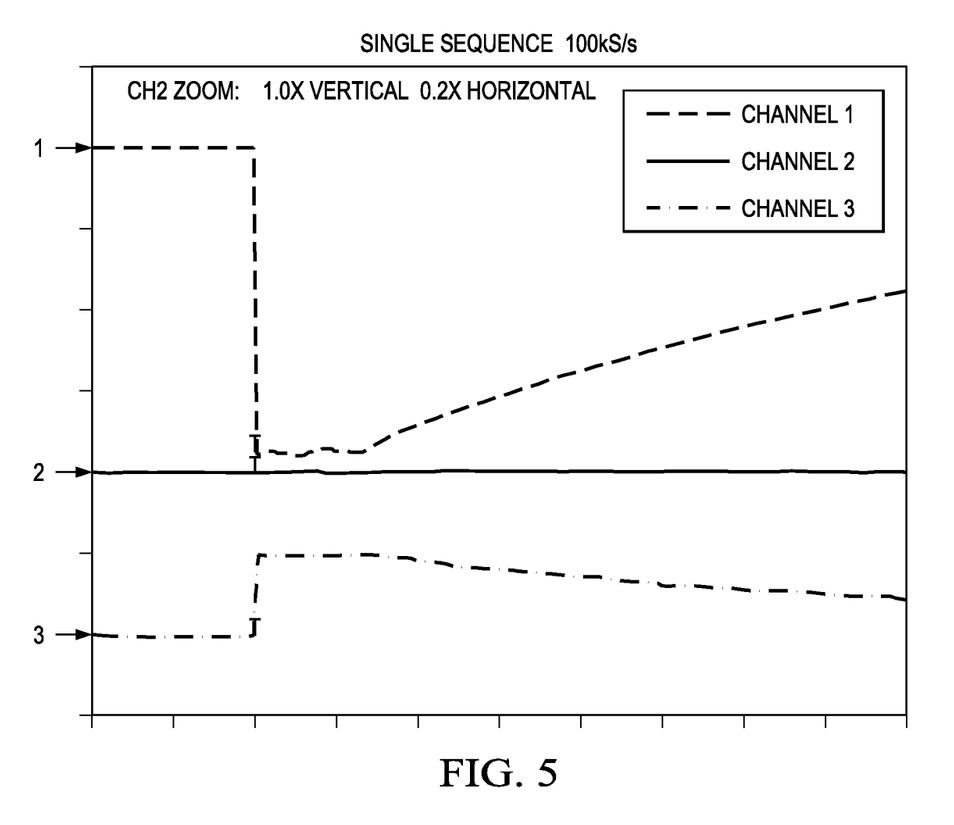
FIG. 5 illustrates a graph of waveforms generated by a ground fault test for a return conductor to Earth connection employing an embodiment of a fault detector constructed according to the principles of the present invention.

Turning now to FIGS. 4 and 5, illustrated are graphs of waveforms generated by a ground fault test for an output conductor to Earth connection and a return conductor to Earth connection. The testing employs an embodiment of a fault detector constructed according to the principles of the present invention. Both graphs include the outputs of three channels. Channel 1 represents the voltage across the 18 k ohm ground fault resistor. Channel 2 represents the voltage across the return conductor of the wire-pair and Earth. Channel 3 represents the current through the 18 k ohm ground fault resistor. For channel 1, the vertical divisions are in 50.0 V increments. For channel 2, the vertical divisions are 200 mV. For channel 3, the divisions are 10.0 mA. The horizontal axis is time in both graphs. Channel 2 represents a ground fault detection signal.

In FIG. 4, an 18 k ohm resistor was connected between the −190 VDC output conductor of a telephone wire-pair and Earth. When the ground fault occurs, channel 2 increases representing ground fault current detected passing through the passive sensor. The fault current is detected and the output on the output conductor is lowered. About 1 ms later, the ground fault current is detected again and full fault condition is declared. As such, the output is turned-off.

In FIG. 5, an 18 k ohm resistor was connected from Earth to the return conductor to short the return conductor of the wire-pair to Earth. The channel 2 output is basically zero which is below the no-fault offset level of FIG. 4. The present invention uses this condition and the fact that there is current flowing in the wire-pair as detected, for example, by load current sensors and the controller, to indicate a ground fault condition on the return conductor.

Although the present invention has been described in detail, those skilled in the art should understand that they can make various changes, substitutions and alterations herein without departing from the spirit and scope of the invention in its broadest form.

What is claimed is:

1. A fault detector for use with a telephone wire-pair having a return conductor and an output conductor, comprising:
    a passive sensor coupled between Earth and said wire-pair to detect a ground fault thereon;
    an amplifier having inputs coupled across said passive sensor and configured to characterize said ground fault in terms of a value; and
    a controller configured to receive said value via an output of said amplifier and compare said value to a threshold to determine if said ground fault exceeds a safety limit.

2. The fault detector as recited in claim 1 wherein said threshold is a pre-established threshold representing a fault connection between said output conductor and Earth.

3. The fault detector as recited in claim 1 wherein said threshold is a pre-acquired value for detecting a ground fault associated with said return conductor.

4. The fault detector as recited in claim 3 wherein said controller is configured to determine a ground fault on said return conductor based on said pre-acquired value and knowledge of current flow through said wire-pair.

5. The fault detector as recited in claim 1 wherein said fault detector is coupled between said return conductor and Earth.

6. The fault detector as recited in claim 1 wherein said sensor is a shunt resistor and said amplifier is an op-amp.

7. The fault detector as recited in claim 1 wherein said safety limit is 10 mA.

8. A method of protecting a telecommunications network including a telephone wire-pair having a return conductor and an output conductor, comprising:
    detecting a ground fault on said wire-pair;
    characterizing said ground fault in terms of a value;
    determining, based on said value, if said ground fault is a fault of said return conductor or a fault of said output conductor;
    selecting a threshold based on said determining; and
    comparing said value to said selected threshold to determine if said ground fault violates a safety limit, wherein said determining, said selecting and said comparing are performed by a processor.

9. The method as recited in claim 8 wherein said threshold is a pre-established threshold representing a fault connection between said output conductor and Earth.

10. The method as recited in claim 8 wherein said threshold is a pre-acquired value for detecting a ground fault associated with said return conductor.

11. The method as recited in claim 8 wherein said safety limit is 10 mA.

12. The method as recited in claim 8 further comprising issuing a command to reduce power transmitted on said wire-pair when said ground fault violates said safety limit.

13. The method as recited in claim 12 wherein said power is provided by a converter and said command turns-off said converter.

14. The method as recited in claim 12 wherein said determining, said selecting, said comparing and said issuing are performed by a microcontroller.

15. A power supply for a telecommunications network, comprising:
    a power converter configured to provide power to a telephone wire-pair having a return conductor and an output conductor, and a fault detector including:
- a passive sensor coupled between Earth and said wire-pair to detect a ground fault thereof;
- an amplifier having inputs coupled across said passive sensor and configured to characterize said ground fault in terms of a value; and
- a controller configured to receive said value via an output of said amplifier and compare said value to a threshold to determine if said ground fault exceeds a safety limit, said controller further configured to direct said power converter to reduce power provided to said wire-pair based on said compare.

16. The power supply as recited in claim 15 wherein said threshold is a pre-established threshold representing a fault connection between said output conductor and Earth.

17. The power supply as recited in claim 16 wherein said threshold is a pre-acquired value for detecting a ground fault associated with said return conductor.

18. The power supply as recited in claim 15 wherein said fault detector is coupled between said return conductor and Earth.

19. The power supply as recited in claim 15 wherein said sensor is a shunt resistor and said amplifier is an op-amp.

20. The power supply as recited in claim 15 wherein said safety limit is 10 mA.

* * * * *

UNITED STATES PATENT AND TRADEMARK OFFICE
CERTIFICATE OF CORRECTION

PATENT NO. : 8,275,559 B2  Page 1 of 1
APPLICATION NO. : 12/058437
DATED : September 25, 2012
INVENTOR(S) : Raymond Rene et al.

It is certified that error appears in the above-identified patent and that said Letters Patent is hereby corrected as shown below:

Title Page

Line (73) Assignee: "Linage Power Corporation, Mesquite,"

Should read:   --Lineage Power Corporation, Mesquite,--

Signed and Sealed this
Nineteenth Day of February, 2013

Teresa Stanek Rea
*Acting Director of the United States Patent and Trademark Office*